Jan. 26, 1954   W. I. GLADFELTER ET AL   2,667,014
WET BLASTING APPARATUS
Filed June 29, 1951

WILTIE I. GLADFELTER
and CHARLES P. CROFT
INVENTORS

BY
ATTORNEY

Jan. 26, 1954  W. I. GLADFELTER ET AL  2,667,014
WET BLASTING APPARATUS
Filed June 29, 1951
2 Sheets-Sheet 2

WILTIE I. GLADFELTER
and CHARLES P. CROFT
INVENTORS

BY

ATTORNEY

Patented Jan. 26, 1954

2,667,014

UNITED STATES PATENT OFFICE 2,667,014

WET BLASTING APPARATUS

Wiltie I. Gladfelter and Charles P. Croft, Hagerstown, Md.

Application June 29, 1951, Serial No. 234,392

12 Claims. (Cl. 51—8)

The present invention relates to blasting apparatus and particularly to those types of apparatus in which a stream of blastant particles mixed with liquid is projected against work articles to clean or modify the surface of these articles.

Blasting apparatus of this type have previously been heavily burdened by the fact that they use tremendous volumes of liquid and accordingly involve considerable expense even when this liquid is ordinary tap water.

Among the objects of the present invention is the provision of novel blasting apparatus of the above type which avoids the above disadvantage, as well as the provision of novel components of such apparatus.

The above as well as additional objects of the present invention will be more completely understood from the following description of several of its exemplifications, reference being made to the accompanying drawings wherein.

According to the present invention there is provided a blasting apparatus having a blast projector with impelling structure connected to project against work articles a stream of blastant particles mixed with liquid, and recycling structure connected to collect the projected blastant material, separate out most of the liquid, clarify the separated liquid and return the clarified liquid for additional blasting. In order to clarify the liquid for reuse in blasting, chemical clarifying material may be added and the clarifying structure may include a settling tank, inlet structure for the introduction of water clarifying material and water to be clarified, agitating structure adjacent said inlet structure and connected to mix the introduced materials and discharge the mixed materials into the body of the settling tank, louvres in the settling tank defining a relatively quiescent zone in which settling of the sludge takes place, said tank having outlet structure for discharging the clarified water after settling, and conveyor mechanism connected for removing the sludge settling through the louvres.

Figure 1:
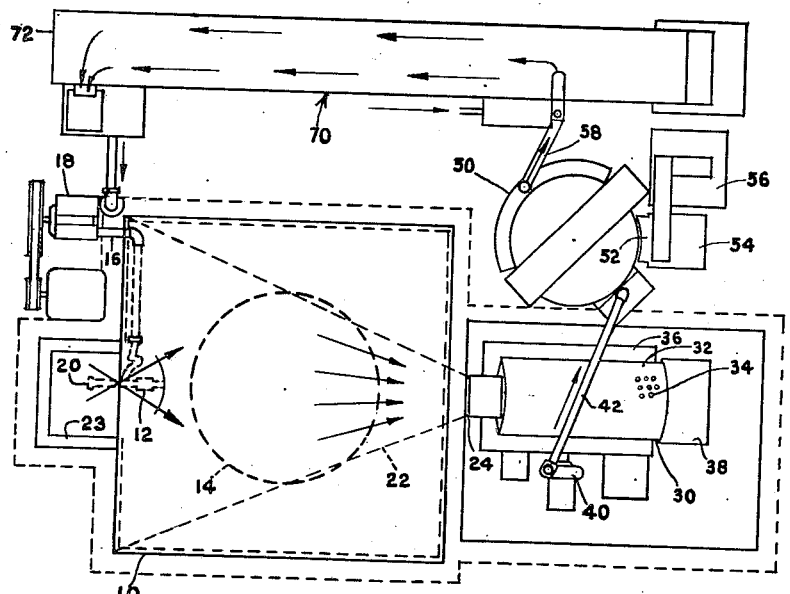
Fig. 1 is a plan view, in outline form, of a blasting apparatus illustrating the present invention.

The apparatus of Fig. 1 is shown as including a blasting chamber 10 equipped with a blasting nozzle 12 and a work-carrying platform shown as a table 14. Work articles are arranged to be introduced in the chamber 10 and on to platform 14 as by means of a door or retractable passageway covering at one or more of the walls and/or the ceiling of chamber 10. The nozzle 12 is connected by means of line 16 to a high-pressure pump 18 and has another intake line 20 leading to a slurry of blastant particles, such as sand in water. In the form shown the slurry may be pumped to the nozzle at any convenient pressure, generally fairly low. As is well known, the pump 18 supplies water at pressures of at least 500 pounds per square inch, preferably higher, and impels it along with the blastant particles against the work articles being treated. If desired a slurry feeding pump can be omitted and the high pressure stream of water used to suck the slurry through the nozzle as by using the technique described in the U. S. patents to Keefer, No. 2,369,576 granted February 13, 1945, and No. 2,503,743, granted April 11, 1950.

The floor of chamber 10 is shaped to collect the projected blastant materials after they drain from the work articles and funnel them to a coarse separator indicated generally at 30. To effect this funneling the floor of chamber 10 is shown in Fig. 1 as having a tapered central trough 22 with a depressed outlet 24, the coarse separator 30 being positioned below this outlet as by being located in a pit excavated in the floor alongside chamber 10. Work supporting holder 14 need not be fixed directly within trough 22 but may be held above it as by means of a perforated chamber floor which can conveniently be in the form of a metal gridwork. If desired, this chamber floor may have rails on which the work supporting structure can be rolled in and out of the chamber, particularly where the work articles are of the bulky type and can be mounted on rail-mounted cars or wheel trucks.

The coarse separator 30 is shown as including a rotatable cylindrical screen 32 into one end of which the trough outlet 24 supplies collected blastant, and the walls of which have perforations 34 large enough to permit the blastant particles and the water to drop through into a receptacle 36. Coarser articles, such as the detritus which is removed from the work articles by the blasting operation, discharge from the other end of the cylindrical screen 32 into a waste receiver 38 for manual or automatic, and continuous or intermittent removal.

Figure 2:
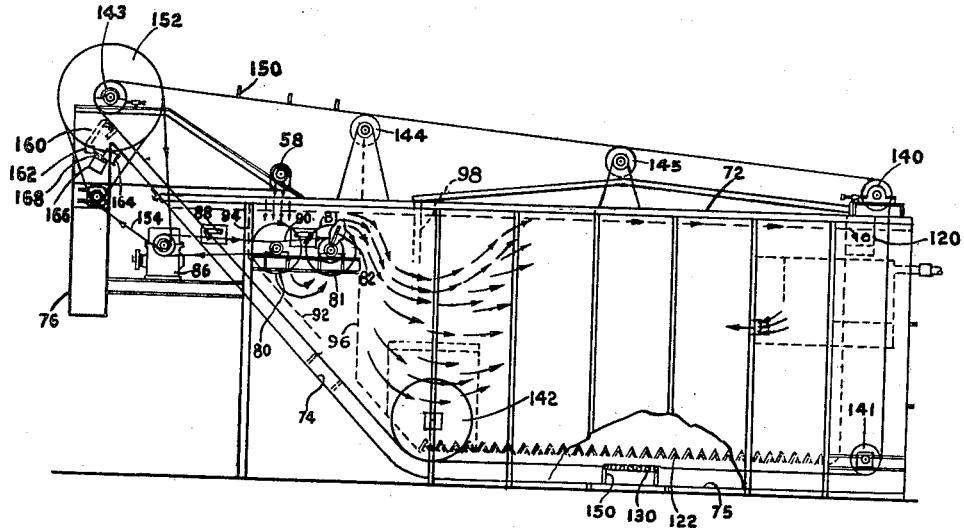
Fig. 2 is a side elevation, with parts in section, of a portion of the apparatus of Fig. 1.
Figure 3:
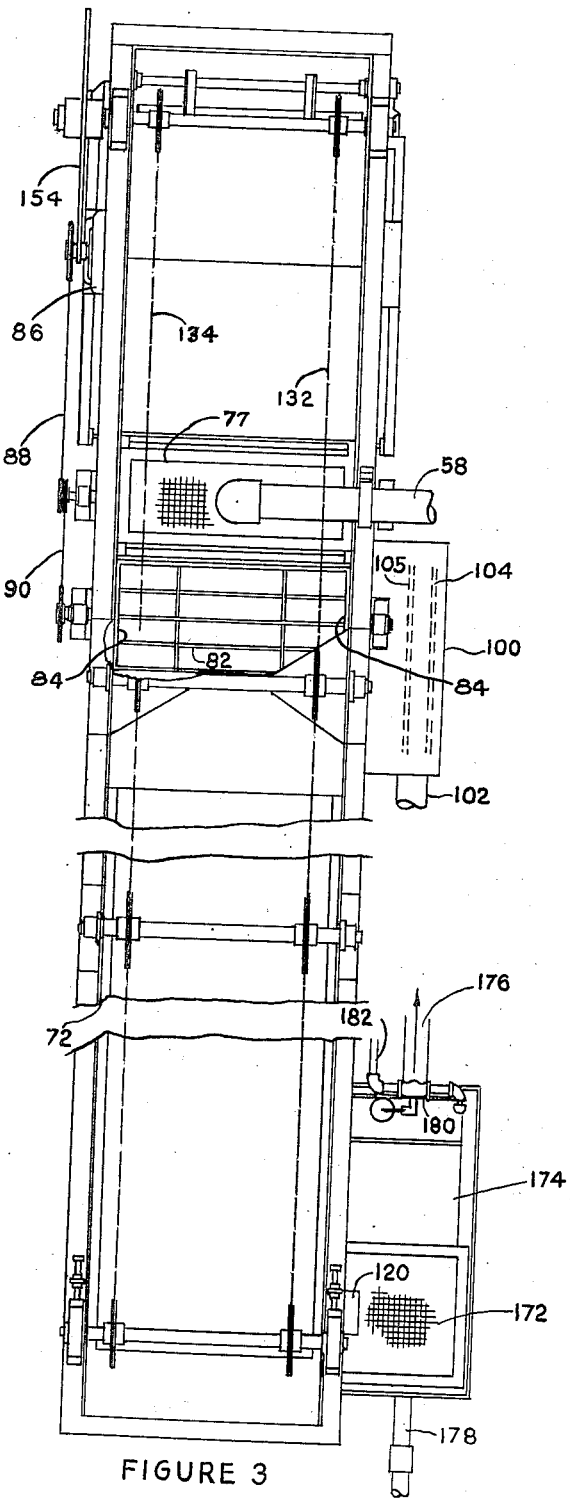
Fig. 3 is a plan view partly broken away of the structure of Fig. 2.

An impelling pump 40 connected with the lower portion of receptacle 36, which may be tapered in hopper fashion, moves the collected blastant and the water through line 42 to a classifier 50. The classifier which can be of the usual kind has a coarse slurry outlet 52 through which the coarser blastant particles along with some of the liquid are discharged in the form of a slurry for storage in a tank 54 or removal by means of receptacle 56. A liquid or fine slurry outlet 58 from classifier 50 discharges the finer blastant particles along with the balance of the collected liquid to a clarifier indicated generally at 70 and more particularly shown in Figs. 2 and 3.

Clarifier 70 comprises an elongated tank 72 of generally rectangular form with a floor 75 that tapers up at one end 74 and leads to a discharge spout 76. Conduit 58 introduces the fine slurry over the tapering portion 74 of the floor where a coarse particle trapping screen 77 can be provided in the form of a removable basket.

Within the tank adjacent the portion at which conduit 58 empties, a pair of agitators 80, 81 are positioned. These agitators are shown as assemblies of vanes 82, held between side discs 84 in generally cylindrical relation, and rotated around the axis of the cylinder which is horizontally disposed. Both agitators 80, 81 are shown as rotated in either the same or different directions and either clockwise or counter-clockwise as by means of an electric motor 86, belts 88 and 90, and appropriately provided pulleys. Violent agitation is preferred.

Adjacent these agitators an external electrolyzing container 100 communicates with the interior of tank 72 and is provided with a separate water supply line 102 and a set of electrodes 104, 105 connected to a suitable source of direct electric current, not shown, at a potential of at least about 10 volts. One of the electrodes 104, 105 is of aluminum or aluminum alloy composition, and this electrode is connected as the anode so that electrolytic anodic oxidation products of aluminum are formed in the water in container 100. The electrolyzed water containing the anodic oxidation products is introduced into the tank 72 along with the fine slurry discharged through conduit 58 and these two supplies are particularly well mixed when one of the agitators, as for example agitator 80, is rotated at a slower speed than its companion agitator. Baffles as indicated at 92, 94, 96 and 98 confine the more vigorous portions of the agitations to the regions closely adjoining the agitators and permit the introduced fluids to move into the main body of the tank where they are relatively free of turbulence and pass without appreciable agitation out over an overflow spout 120.

In the body of the tank the larger of the suspended particles that are supplied in the fine slurry settle under the influence of gravity assisted by the clarifying action of the added clarifier such as the anodic aluminum oxidation products described above. A set of louvres 122 shown as spaced inverted V-shaped angular plates, are disposed above the floor 75 and effect a water-baffling action sufficient to define a relatively quiescent zone through which the settling particles move very readily to the bottom of the tank.

The louvres 122 are spaced above the tank floor 75 and in this space is threaded a sludge conveyor 130 shown in the form of a pair of chains 132, 134 looped around sprockets 140, 141, 142, 143, 144 and 145, and carrying a set of laterally extending spaced drag plates 150. The conveyor is cycled slowly as by providing sprocket 143 with a pulley 152 connected by belt 154 with motor 86. The drag plates, as they move along the tank floor 75, carry the settled sludge along with them up the sloping section 74 and into the top of spout 76. A scraper blade 160 pivoted at support 162 and counterbalanced as by means of weight 164 engages the individual drag plates as they move through the top of spout 76 and scrapes off any sludge adhering to them. A stop 166 having a silencing bumper 168 can be effectively used to properly position the scraper blade for engagement by the drag plates and to assure that this blade returns to its proper position after it is deflected by a passing plate.

The clarifying material used in accordance with the present invention is not limited to the electrolytic oxidation products described above but can be of any suitable kind such as stoichiometric mixtures of aluminum sulphate and calcium hydroxide. However, the electrolytic unit is particularly efficacious. It not only reduces the amount of the sludge, which normally accumulates at an extremely rapid rate, but makes possible the compacting of the entire clarifying apparatus.

From the overflow spout 120, the clarified water passes through fine mesh screen 172 into a head box 174 from which it returns to the intake of the high-pressure pump by means of conduit 176 or discharges at conduit 178 to waste. A float valve 180 responsive to the level of liquid in the head box 174 shuts off or adds a controllable amount of replenishing water from conduit 182 in accordance with the supply of clarified water available.

The clarified out-flow in head box 174 need not be entirely free of blastant particles. Particles as fine as about 300 mesh or finer present no difficulties and can be carried along with the recirculating liquid through the high-pressure pump 18 and back into the blasting cycle. Coarser particles cause serious abrasion of the pump but are effectively removed from the recirculating water in the clarifier. This partial clarification enables a considerable shortening of the settling time in the clarifier tank so that a relatively small clarifying apparatus is all that is needed to handle the large volumes of liquid involved in the blasting.

In practical application blastant particles are generally between about 40 and about 250 mesh in size, and are common sand, although other types of gritty material can also be used. The classifier 50 should be adjusted so that it separates out a thick slurry of particles having a size corresponding to those originally delivered to the blast projector, leaving finer particles to be carried out with the excess water. This not only reduces the clarifying action required, but causes least waste of blastant.

The particular details of the blasting chamber 10 and nozzle 12 form no part of the present invention. Any suitable combination can be used with the recirculating apparatus shown. Thus, for example, the blasting nozzle can be arranged either to swivel about as indicated in the drawings, or can be slidable along the chamber wall, or can be both slidable and swiveled in order to be readily directable from any desired angle on the work pieces. Alternatively, the nozzle can also be fixed in place and the work pieces rotated or otherwise moved, as for example by revolving table 14 around a central vertical axis.

To complete the automatic recirculation a slurry pump (not shown) such as the one shown at 40 is connected between tank 54 and the nozzle line 20 to return the coarser abrasive particles for further blasting. If desired the portions of the apparatus can be relocated as by moving the nozzle to the opposite wall of chamber 10 so that the classifier outlet 52 is positioned alongside the nozzle 12 and the recirculating slurry is pumped or sucked through a shorter length of conduit and be less likely to jam. Furthermore the classifier can have its outlet 52 high enough to supply part or all the desired slurry moving force by the action of gravity. Inasmuch as the operation of the equipment may result in the accumulation of additional abrasive particles as for example in the form of the mold and core sand that is removed from the work articles when they are castings being cleaned, the tank 56 can be used to collect excess abrasive particles.

To provide access to trough 22 underneath chamber 10, as for the purpose of cleaning it or removing large objects, this trough can be extended out at its upper end beyond the margins of chamber 10 as indicated at 23.

Many of the advantages of the present invention will be obvious. These include a substantial reduction in production cost for foundry work by reason of decreased casting-cleaning time, reduction in labor costs through permitting one-man operation, provision for complete recovery of the casting sand and core rods, complete elimination of dust, and a reduction in roughing and chipping costs.

A feature of the present invention, in addition to the blastant liquid recirculation, is that it becomes economically practical to add treating agents to the liquid to provide additional effects. Thus, rust inhibiting agents such as zinc chromate can be dissolved in the blastant liquid to reduce corrosion of iron work articles, instead of using the usual protective after-treatments. Freshly wet-blastant articles are generally quite susceptible to corrosion and such protective measures are a necessity. In addition, the blastant liquid can be arranged to carry chemical cleaning agents such as detergents, emulsifiers, etc., to improve the blasting action on soiled surfaces. Such additions are not feasible where the liquid is used only once and then discarded without recirculation.

As many apparently widely different embodiments of this invention may be made without departing from the spirit and scope hereof, it is to be understood that this invention is not limited to the specific embodiments hereof except as defined in the appended claims.

What is claimed is:

1. A water clarifying apparatus including a settling tank, inlet structure for the introduction of water clarifying material and water to be clarified, agitating structure adjacent said passageway and connected to mix the introduced materials and discharge the mixed materials into the body of the settling tank, louvres in the settling tank defining a relatively quiescent zone in which settling of sludge takes place, said tank having outlet structure for discharging the clarified water after settling, and conveyor mechanism connected for removing the sludge settling through the louvres.

2. The combination as defined by claim 1 in which the inlet structure includes an electrolyzing container through which water is passed, and a set of electrodes including an aluminum anode in said container for electrolyzing the water passing therethrough and introducing into the water anodic oxidation products of said electrode.

3. In a wet-blasting apparatus, a blasting machine having impelling structure connected to projects against work articles a stream of blastant particles mixed with liquid to work the surfaces of the articles and remove debris therefrom, collecting means for collecting the projected blastant particles and liquid together with the debris from the work articles, separating means for separating large sized particles of the said debris from the mixture of blastant particles and liquid, a classifying apparatus connected to receive the mixture of blastant particles and liquid from said separator and adapted to classify said mixture and separate a thick slurry containing the large sized particles of said blastant material from said mixture, a clarifying apparatus connected with said classifier to receive the remaining mixture therefrom and including structure for clarifying the liquid portion of the mixture, and recycling means connected to return the clarified liquid to the blasting machine for additional blasting.

4. The combination set forth in claim 3 in which said separator includes a rotating perforated cylinder into which said mixture of blastant particles, liquid and debris is discharged.

5. The combination set forth in claim 3 in which said clarifier includes a settling tank having an inlet structure connected to said classifier and an agitating structure adjacent said inlet, said agitating structure including means for chemically clarifying said mixture and causing foreign materials in the liquid of said mixture to settle out.

6. A method for reusing a used wet-blasting mixture ejected from a wet-blasting apparatus impeller, said method comprising the steps of mechanically separating coarse debris particles from said mixture, then mechanically classifying the residual mixture into two separate portions one of which is a thick slurry including reusable blastant particles having a relatively large size and the other of which is a thin slurry containing fines of blastant particles and foreign matter, mixing a water clarifying material with said second slurry, agitating said clarifying mixture settling said agitated mixture so as to cause precipitation of said fine blastant particles and foreign matter, and mixing the thus clarified water with blastant particles suitable for another blasting operation.

7. The method set forth in claim 6 including the further step of separately returning said clarified liquid and said thick slurry to the impelling structure of the wet-blasting apparatus.

8. The process set forth in claim 6, in which said water clarifying material includes the electrolytic oxidation products of aluminum.

9. In a wet-blasting apparatus including a blasting machine having a blastant particle impelling structure connected to project said particles against work articles as a stream of particles suspended in a liquid carrier in order to remove debris from said articles, the combination of collecting means for collecting the projected blastant particles, debris and liquid carrier after the impingement upon said work articles, and recycling structure connected between said collecting means and said impelling structure including debris separating apparatus for separating gross pieces of work debris from said mixture of blastant particles and carrier liquid, classifying means for separating a thick slurry of blastant particles from said mixture, clarifying means for clarifying the liquid carrier in the remaining mixture, and separate conduit means for separately conducting said clarified liquid carrier and said thick slurry to said impelling structure to provide automatic recycling.

10. The combination set forth in claim 9 in which the classifying means includes a mechanical separator and the clarifying means includes structure for introducing the electrolytic anodic oxidation products of aluminum into the said remaining mixture.

11. A blastant recirculating wet-blasting apparatus comprising a blasting machine having impelling structure connected to project against work articles a stream of carrier liquid containing blastant particles and recirculating structure connected to collect the projected material including the blastant particles, the liquid carrier and debris from the work articles, said recirculating structure including a classifying apparatus for separating a concentrated slurry of blastant particles of the order of between 40 and 250 mesh in size from said collected materials, clarifying apparatus for clarifying the carrier liquid in the remaining materials so collected and a recirculating conduit connected to return the clarified liquid to the blasting machine.

12. The combination set forth in claim 11 in which separate conduit means are provided for recycling the segregated slurry of blastant materials and clarified carrier liquid respectively to said impelling structure.

WILTIE I. GLADFELTER.
CHARLES P. CROFT.

References Cited in the file of this patent

UNITED STATES PATENTS

| Number | Name | Date |
|---|---|---|
| 599,957 | Curtis | Mar. 1, 1898 |
| 1,519,250 | Gelstharp | Dec. 16, 1924 |
| 1,907,411 | Timoney | May 2, 1933 |
| 1,966,571 | Webb | July 17, 1934 |
| 2,086,653 | Watson et al. | July 13, 1937 |
| 2,200,587 | Tirell | May 14, 1940 |
| 2,393,596 | Dexter | Jan. 29, 1946 |
| 2,462,480 | Eppler | Feb. 22, 1949 |